(12) United States Patent
Aviani et al.

(10) Patent No.: US 6,789,125 B1
(45) Date of Patent: Sep. 7, 2004

(54) DISTRIBUTED NETWORK TRAFFIC LOAD BALANCING TECHNIQUE IMPLEMENTED WITHOUT GATEWAY ROUTER

(75) Inventors: James Aviani, Santa Barbara, CA (US); David Eric Swanson, Santa Barbara, CA (US); Frederick Baker, Santa Barbara, CA (US); Kenneth E. Mueller, II, Santa Barbara, CA (US); Matthew Richard Gnagy, Sacramento, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/569,083

(22) Filed: May 10, 2000

(51) Int. Cl.$^7$ .............................................. G06F 15/16
(52) U.S. Cl. ..................................................... 709/238
(58) Field of Search ................................ 709/203, 217, 709/220, 223, 230, 238

(56) References Cited

U.S. PATENT DOCUMENTS

| | | |
|---|---|---|
| 5,414,704 A | 5/1995 | Spinney |
| 5,488,412 A | 1/1996 | Majeti et al. |
| 5,506,987 A | 4/1996 | Abramson et al. |

(List continued on next page.)

FOREIGN PATENT DOCUMENTS

| | | |
|---|---|---|
| WO | WO98/31107 | 7/1998 |

OTHER PUBLICATIONS

Eager et al., "Adaptive Load Sharing in Homogeneous Distributed Systems," IEEE, Transactions on Software Engineering, vol. Se–12, No. 5, May 1986, PP 662–675.
Akamai Technologies, Inc. –Global Internet Content Delivery–"How FreeFlow Works," webmaster@akamai.com 1999–2000.
Digital Island, Inc. –e–Business Without Limits–, "Enabling Technologies," http://www.digisle.net. No date.
Internap, "Preferred Collocation Services," http://www.internap.com Copyright © 2001 Internap Network Services Corporation.
Meyer, et al., Request For Comments No. 2026, entitled, "Generic Routing Encapsulation (GRE)," Jan., 2000, Internet Engineering Task Force, 9 pages.

(List continued on next page.)

*Primary Examiner*—David Y. Eng
(74) *Attorney, Agent, or Firm*—Beyer Weaver & Thomas, LLP; Dean E. Wolf, Esq.

(57) ABSTRACT

The technique of the present invention provides a solution to the problem of routing or redirecting a given client to a replica or proxy server which has a relatively shortest propagation delay to the client. According to the technique of the present invention, a network device referred to as an intercept server sits in front of a host server, and intercepts packets routed to the host server. When desired, packets which are intercepted by the intercept server are replicated, encapsulated and tunneled to selected client servers in the overlay network. The tunneled packets are received and processed by each of the selected client servers, whereupon each of the selected client servers generates a respective spoofed response to the source device identified in the header of the originally intercepted packet. Further, according to the technique of the present invention, each of the selected client servers transmits its respective spoofed response to the identified source device at substantially the same time. The client server associated with the spoofed response which is first received at the identified source device is considered to have the relatively shortest propagation delay to the identified source device, and is identified as the successful client server. Thereafter, the source device will be directed or redirected to communicate directly with the successful client server when subsequently attempting to access information from the host server.

57 Claims, 7 Drawing Sheets

U.S. PATENT DOCUMENTS

| | | |
|---|---|---|
| 5,586,121 A | 12/1996 | Moura et al. |
| RE35,774 E | 4/1998 | Moura et al. |
| 5,818,845 A | 10/1998 | Moura et al. |
| 5,828,655 A | 10/1998 | Moura et al. |
| 5,859,852 A | 1/1999 | Moura et al. |
| 5,872,773 A | 2/1999 | Katzela et al. |
| 5,892,903 A | 4/1999 | Klaus ................... 395/187.01 |
| 5,946,047 A | 8/1999 | Levan |
| 5,946,048 A | 8/1999 | Levan |
| 5,950,205 A | 9/1999 | Aviani, Jr. |
| 5,953,335 A | 9/1999 | Erimli et al. |
| 5,956,346 A | 9/1999 | Levan |
| 5,959,660 A | 9/1999 | Levan |
| 5,959,968 A | 9/1999 | Chin et al. |
| 5,959,997 A | 9/1999 | Moura et al. |
| 5,989,060 A | 11/1999 | Coile et al. |
| 6,006,266 A | 12/1999 | Murphy et al. ............. 709/227 |
| 6,016,388 A | 1/2000 | Dillon ................... 395/200.72 |
| 6,167,438 A * | 12/2000 | Yates et al. ................. 709/216 |
| 6,205,481 B1 * | 3/2001 | Heddaya et al. ............ 709/226 |
| 6,324,564 B1 * | 11/2001 | Thielke et al. ............. 709/202 |
| 6,532,493 B1 * | 3/2003 | Aviani, Jr. et al. .......... 709/224 |

OTHER PUBLICATIONS

Mockapetris, P., Request For Comments No. 1034, entitled, "Domain Names—Concepts and Facilities," Nov., 1987, Internet Engineering Task Force, 31 pages.

Information Sciences Institute, Request for Comments No. 793, entitled "Transmission Control Protocol—DARPA Internet Program—Protocol Specification," Sep., 1981, Internet Engineering Task Force, 49 pages.

* cited by examiner

DISTRIBUTED NETWORK TRAFFIC LOAD BALANCING TECHNIQUE IMPLEMENTED WITHOUT GATEWAY ROUTER

RELATED APPLICATION DATA

This invention is related to U.S. patent application Ser. No. 09/569,090 filed concurrently herewith, naming James Aviani, David Eric Swanson, Frederick Baker, Kenneth E. Mueller II, and Matthew Richard Gnagy as inventors, and entitled, "DISTRIBUTED NETWORK TRAFFIC LOAD BALANCING TECHNIQUE IMPLEMENTED WITHOUT GATEWAY ROUTER." That application is incorporated herein by reference in its entirety and for all purposes.

BACKGROUND OF THE INVENTION

1. Field of the Invention

The present invention relates generally to data networks, and more specifically to a technique for distributed load balancing of network traffic across a data network.

2. Background

Content providers on the World Wide Web are willing to pay a great deal of money to guarantee that their content is delivered quickly and accurately to any given client. Accordingly, a great deal of research has been conducted to address the problem of speeding up HTTP transactions conducted between a client and a server, particularly in situations where there is a relatively large propagation delay between the client and the server.

Although the speed of data transmission across the Internet is continuing to increase, the propagation delay associated with the speed of an electrical signal traveling through a wire or fiberoptic cable (i.e. the speed of light) cannot be reduced. Such delays are becoming a significant factor in the overall propagation delay between the server and client. In order to reduce the overall propagation delay between a given server and a given client, conventional techniques have resorted to replicating the server system, and placing multiple copies of the replicated server system at locations as near as possible to the client.

Thus, for example, a common technique used by content providers is to store content from the host server in co-location spaces that are geographically distributed over a wide area. The co-location spaces form an overlay network that is more costly and less flexible, but provide better service than the traditional Internet. Typically the ISPs which manage the co-location spaces charge the content provider for each megabyte stored in the co-location space. The co-location spaces may be implemented as proxy servers, which pull specific data from the host server in response to specific client requests, or may be implemented as fully replicated servers which include all the information of the host server.

Although the use of co-location spaces will help reduce the overall propagation delay between a server and client, another issue which arises relates to the problem of determining how an arbitrary client is redirected to the nearest replica or proxy server, particularly where it is not known ahead of time which clients will be asking for information and where the clients are located. Some conventional techniques have been implemented to address this problem, but typically require the use of a gateway router.

An alternate technique for predicting, for a given client, the nearest replica or proxy server to that client has been developed by Akamai Technologies, Inc. (of Cambridge, Mass.). The proprietary Akamai routing technique involves constructing a network map of the Internet topology. The network map information is stored in a central network operating center or NOC which is located on a specific Akamai server. When a client attempts to access a content provider's site which is part of the Akamai overlay network of co-location servers, the client will initiate a DNS resolution request, which is resolved by the NOC server. The NOC dynamically resolves the requested domain name to a co-location server address that is nearest topologically to the client, using information from the network map.

However, in order for Akamai's routing technique to be successfully implemented, the network topology map must be continually updated and maintained. According to at least one school of thought, however, maintaining an accurate Internet topology may be nearly impossible since the Internet topology is dynamically changing and is exponentially growing in size and complexity each day.

Accordingly, in light of the foregoing, there exists a continual need to develop alternative solutions for providing fast and efficient routing and load balancing of web traffic across data networks.

SUMMARY OF THE INVENTION

According to specific embodiments of the present invention, a technique is provided for routing a client device to access a specific client server in a data network. The data network may include at least one host server, a sub-network of client servers associated with the at least one host server, and at least one client system. According to one embodiment, the data network corresponds to the Internet, wherein the at least one host server corresponds to the host server of a content provider, the sub-network of client servers corresponds to an overlay network of proxy or replica servers, and the client system corresponds to at least one client computer which accesses the Internet via a name server.

The technique of the present invention provides a solution to the problem of routing or redirecting a given client to a replica or proxy server which has a relatively shortest propagation delay to the client. According to the technique of the present invention, a network device referred to as an intercept server sits in front of a host server, and intercepts packets routed to the host server. When desired, packets which are intercepted by the intercept server are replicated, encapsulated and tunneled to selected client servers in the overlay network. The tunneled packets are received and processed by each of the selected client servers, whereupon each of the selected client servers generates a respective spoofed response to the source device identified in the header of the originally intercepted packet. Further, according to the technique of the present invention, each of the selected client servers transmits its respective spoofed response to the identified source device at substantially the same time. The client server associated with the spoofed response which is first received at the identified source device is considered to have a relatively shortest propagation delay to the identified source device, and is identified as the successful client server. Thereafter, the source device will be directed or redirected to communicate directly with the successful client server when subsequently attempting to access information from the host server.

According to specific embodiments of the present invention, a method and computer program product are disclosed for routing a specific device to access a specific client server in a data network which includes a sub-network of client servers associated with at least one host server. A first request from a source device is received. The source device is identified using information from the received request. The identified source device information is then used to determine a first portion of client servers to which the first request will be forwarded. Information relating to the first request is then forwarded to the first portion of client servers. Additionally, each of the first portion of client servers is caused to respond to the source device at substantially the same time.

According to one embodiment, the intercept server determines the associated one-way propagation delay value for communicating with each respective client server in the sub-network. Using this data, the intercept server staggers the transmission of the forwarded first request to each of the first plurality of client servers in order to ensure that the forwarded first requests are received at the first portion of client servers at substantially the same time. According to an alternative embodiment, the intercept server transmits trigger information along with each forwarded first request. The trigger information corresponds to a specific time at which all of the first portion of client servers are to transmit their respective spoofed responses to the source device.

According to alternate embodiments of the present invention, a method and computer program product are disclosed for routing a specific device to access a specific client server in a data network. The data network may include a sub-network of client servers associated with at least one host server. A tunneled packet from an intercept server is received at a first client server. The tunneled packet includes information relating to a first request from the specific device to resolve an address of a host name. The first client server uses information from the received tunneled packet to generate a first spoofed response to the first request. The first spoofed response is then transmitted to the specific device. According to one implementation, the first spoofed response comprises a DNS record response specifying an IP address associated with the first client server.

According to a different embodiment, a tunneled packet from an intercept server is received at a plurality of client servers. The tunneled packet includes information relating to a first request from a specific device to resolve an address for a host name. Each of the plurality of client servers uses the information from the received tunneled packet to generate a respective spoofed response to the first request. The plurality of client servers each transmit their respective spoofed responses at substantially the same time to the specific device.

An alternate embodiment of the present invention is directed to a system for routing a specific device to access a specific client server in a data network. The data network may include a sub-network of client servers configured or designed to store information corresponding to information stored on at least one host server. The system comprises an intercept server in communication with the plurality of client servers and the specific device. The intercept server is configured or designed to intercept a request from a source device. The intercept server is further configured or designed to identify the source device which sent the first request. The intercept server is further configured or designed to determine, using the identified source device information, a first portion of the client servers for forwarding the first request. The intercept server is further configured or designed to forward information relating to the first request to the first portion of the client servers. Additionally, the intercept server is further configured or designed to cause each of the first potion of client servers to respond to the source device at substantially the same time.

An additional embodiment of the present invention is directed to a system for routing a specific device to access a specific client server in a data network. The data network includes at least one host server and an intercept server configured or designed to intercept packets directed to the at least one host server. The system comprises a plurality of client servers configured or designed to store information corresponding to information stored on the at least one host server. The plurality of client servers includes a first client server configured or designed to receive a tunneled packet from the intercept server, wherein the tunneled packet includes information relating to a request from the specific device to resolve an address of a host name. The first client server is further configured or designed to generate, using information from the received tunneled packet, a first spoofed response to the first request. The first client server is further configured or designed to transmit the first spoofed response to the specific device. According to one implementation, the first spoofed response comprises a DNS record response specifying an IP address associated with the first client server.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

Figure 1:
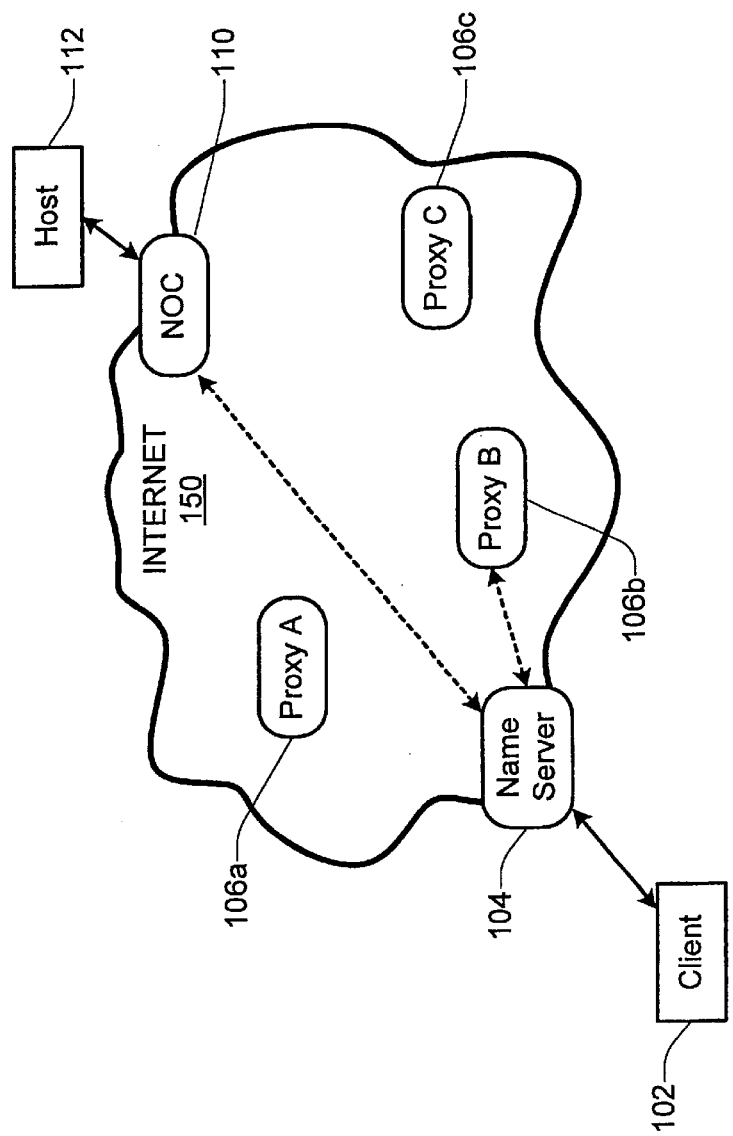
FIG. 1 shows a block diagram illustrating a conventional domain name (DNS) resolution technique which may be implemented over the Internet.

FIG. 1 shows a block diagram illustrating a conventional domain name (DNS) resolution techniques which may be implemented over the Internet. In the example of FIG. 1, it is assumed that the DNS resolution technique is implemented using the Akamai technique described previously in the background section of the application.

In the example of FIG. 1, a user enters a specific domain name (e.g. www.cnn.com) into the web browser of client computer 102. According to the well known DNS protocol, the client computer 102 will provide the domain name along with a DNS A record request to name server 104. The name server 104 processes the various levels of the domain name, and communicates with appropriate authoritative DNS servers throughout the Internet in order to resolve the DNS query and provide an IP address (corresponding to the domain name) to the requesting client 102. The DNS request-resolution protocol is well known to those having ordinary skill in the art, and is described, for example, in RFC document number 1043, herein incorporated by reference in its entirety for all purposes.

In the example of FIG. 1, the domain name provided by the client computer 102 corresponds to host computer 112, which may host the content of a particular content provider's website (such as, for example, www.cnn.com). Additionally, in this example, it is assumed that the content provider is a member of the Akamai overlay network, which includes proxy A server 106a, proxy B server 106b, and proxy C server 106c. In order for the content provider to utilize Akamai's overlay network, the content provider will need to change the content of its website, so that all domain names associated with the content provider are routed through Akamai's network operation center 110.

In attempting to resolve the DNS query received from client 102, the name server 104 eventually communicates with the Akamai network operating center (NOC) 110, which is the authoritative name server for all domain names associated with the Akamai overlay network.

As described previously, Akamai's proprietary technique for resolving DNS queries involves mapping all known Internet domain name servers (e.g. 104) as well as all known proxy servers in the overlay network. Thus, when the Akamai NOC 110 receives a DNS query for a specific domain name from name server 104, the Akamai NOC maps the name server 104 to the nearest replica or proxy server within the overlay network. Accordingly, in this example, NOC 110 will resolve the DNS query to the IP address corresponding to proxy B server 106b, since the proxy B server is the closest topological server to name server 104. When the name server 104 receives the DNS resolution response from NOC 110, the name server binds the resolved IP address to the designated domain name. Thereafter, when the client machine 102 attempts to access the host server 112 using that domain name, the name server 104 will route the client to proxy server B 106b.

However, unlike the Akamai technique, the technique of the present invention enables a client to be routed to a replica or proxy server that is topologically in close proximity to the client without the need to implement complex algorithms or large topological maps. Essentially, with each new flow, the BOOM server of the present invention conducts a race which, by default, uses the most up to date network information available. Moreover, as explained in greater detail below, the technique of the present invention may be implemented using a variety of different protocols, including, for example, DNS, UDP, TCP, etc.

One advantage of the technique of the present invention relates to its ability to function more accurately than current systems while utilizing a far simpler design. Most conventional systems that find the nearest server for a random client require populating the Internet with a number of agents. Such systems often require thousands of agents to even begin to approximate the Internet. Moreover, these agents are difficult to deploy, have great difficulty in getting around fire walls, and often provide dubious or useless information. Additionally, unlike other systems (such as, for example, the Akamai system), a content provider using the present invention need not make any changes to the content of its web site.

Thus, the technique of the present invention provides the advantage of enabling customers to immediately deploy the present invention.

Figure 2:
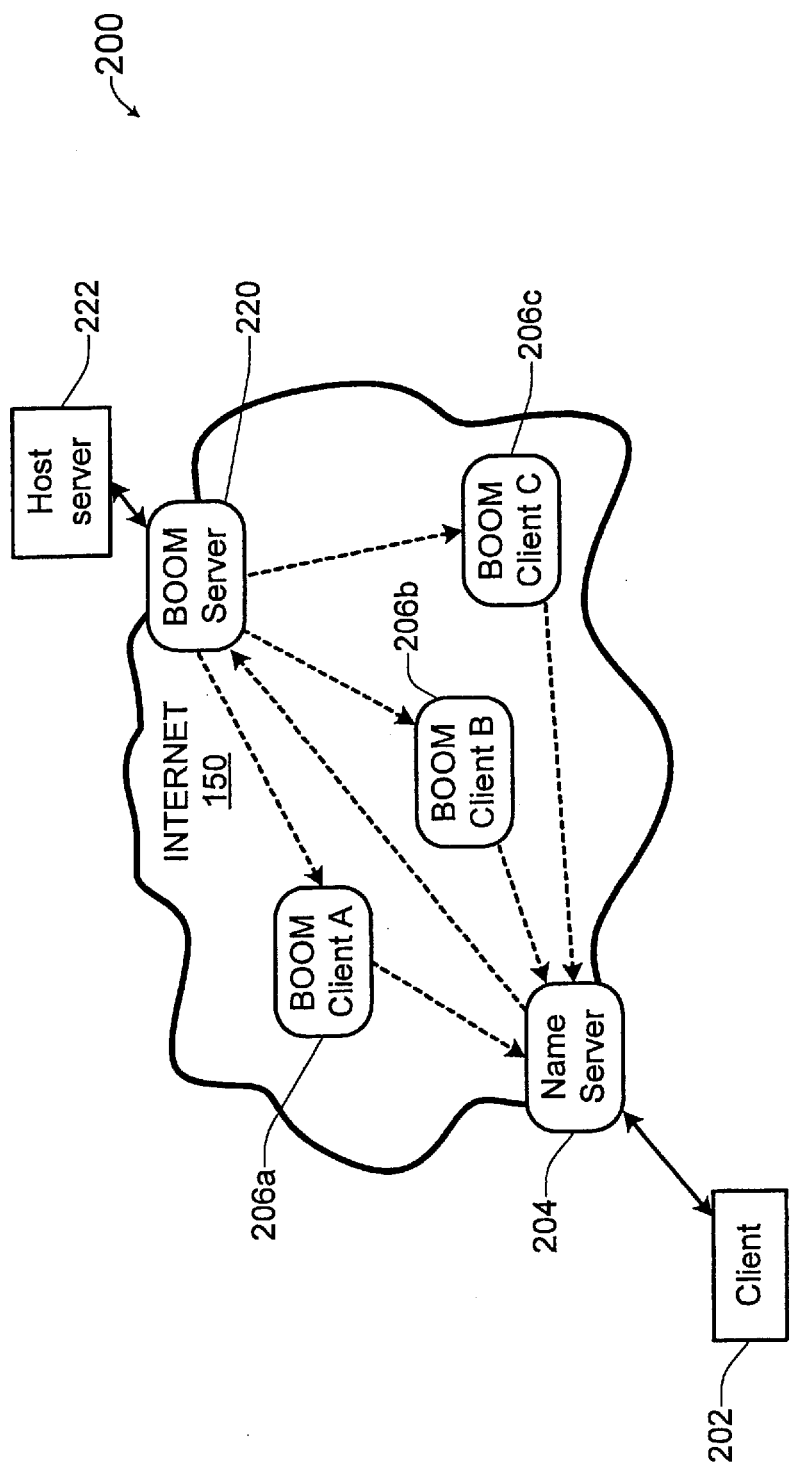
FIG. 2 shows a block diagram of a data network which may be used for implementing a specific embodiment of the present invention.

FIG. 2 shows a specific implementation of the present invention for resolving DNS record queries initiated by client machine 202. It is intended that the following description help illustrate how the technique of the present invention may be used to resolve DNS record queries in a manner such that the resolved IP address corresponds to a BOOM client server which has a relatively shortest propagation delay to the requesting client. Additionally, it is intended that the following example be interpreted with respect to FIGS. 2 and 5 of the drawings.

As shown in FIG. 2, data network 200 includes a host server 222, a BOOM server or intercept server 220, and an overlay network of BOOM client servers 206 (e.g., 206a, 206b, 206c, etc.). According to a specific embodiment, at least a portion of the BOOM client servers may be implemented as proxy or replica servers which automatically handle the complex task of retrieving and cashing desired information from the host server, and managing the retrieved data to ensure the cashed data is up to date. Alternatively, one or more of the BOOM client servers may be implemented as data caches which cache at least a portion of the data located on host server 222, and use the cached data to respond to a variety of different client requests such as, for example, HTTP requests. According to this embodiment, if a BOOM client server receives a request for data which is not cached on that server, the BOOM client server retrieves the desired data from the host server 222 and stores the retrieved data in the BOOM client server cache for servicing subsequent data requests. As shown in the embodiment of FIG. 2, the data network also includes a client machine 202 and a name server 204. According to a specific implementation, the client machine 202 and name server 204 are considered to be part of the same client system. In a specific embodiment, the client machine may include a web browser for enabling the client 202 to communicate with the host server 222 via the Internet 150.

Figure 5:
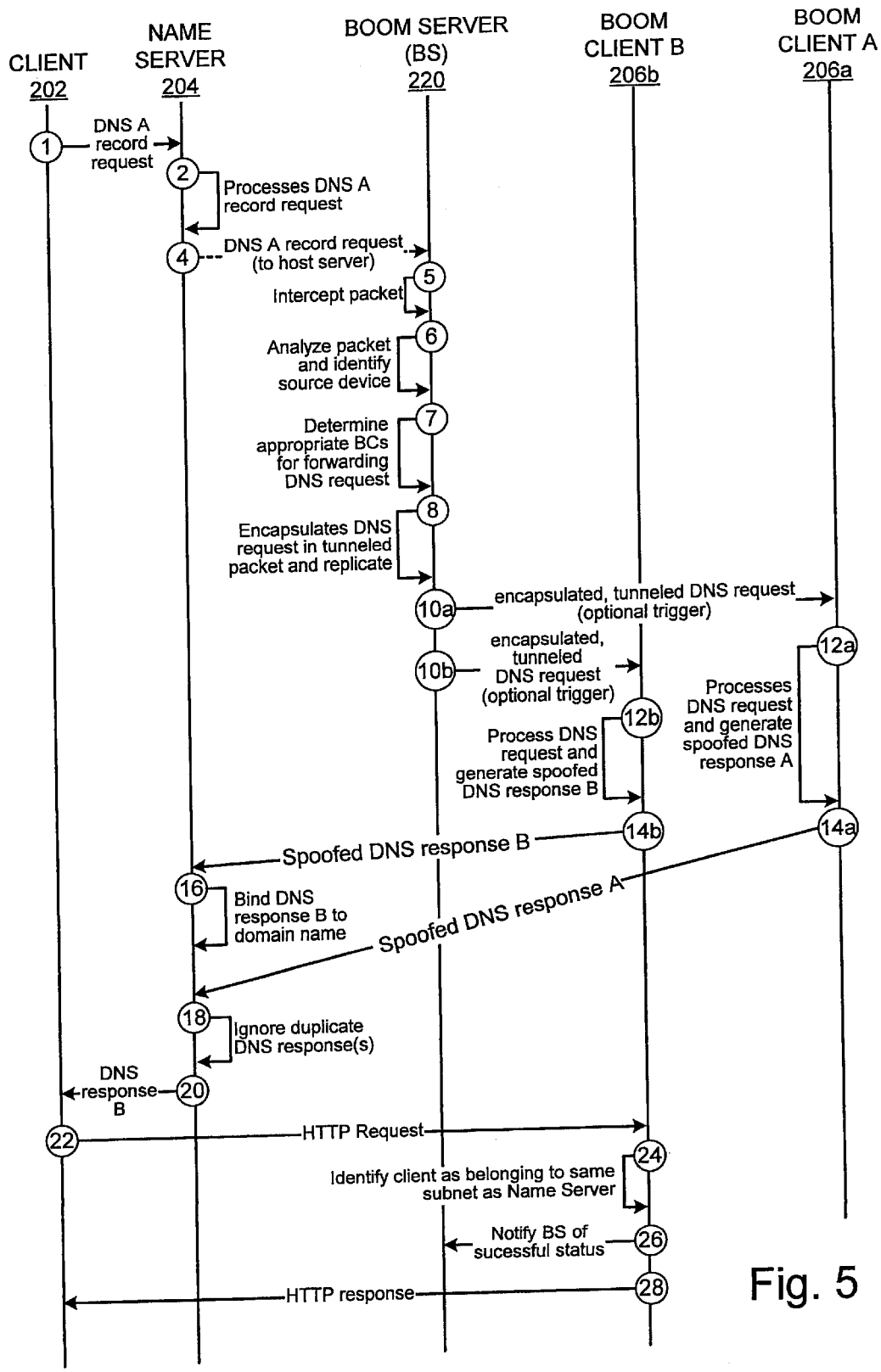
FIG. 5 shows a flow diagram illustrating how the technique of the present invention may be used to resolve a DNS query from a client.

FIG. 5 shows a flow diagram illustrating how the technique of the present invention may be used to resolve a DNS query from a client in such a manner that the resolved IP address corresponds to a BOOM client server in the overlay network which has a relatively shorter propagation delay to the client than most or all of the other BOOM client servers in the overlay network. As stated previously, it is intended that the flow diagram of FIG. 5 be interpreted in conjunction with FIG. 2 of the drawings.

Referring to FIG. 5, at (1) the client 202 submits a DNS record request to name server 204. In this example, it will be assumed that the DNS record request relates to a DNS A record request for the domain name "www.cnn.com", which, in this example, corresponds to host server 222. When the DNS record request is received at name server 204, the name server processes (2) the DNS A record request, and, in this example, discovers that host server 222 is the authoritative name server for fully resolving the specified domain name. Accordingly, name server 204 forwards (4) the DNS request to the host server 222. However, according to at least one embodiment, the BOOM server 220 is configured to sit in front of the host server 222, and inspect all or a portion of selected packets routed to the host server.

It will be appreciated that there are a number of different implementations for configuring the BOOM server 220 to intercept DNS packets. For example, an intercept protocol (such as, for example, the previously referenced WCCP protocol) may be used to cause a router to redirect all incoming DNS packets to the BOOM server 220. The BOOM server may either deny the packet, in which case it is reinserted back to the router who then forwards it towards the destination, or the BOOM server may accept the packet and do normal BOOM processing (described, for example, in FIG. 5). Alternatively, normal DNS information exchange mechanisms may be used to inform network devices that the BOOM server 220 is the DNS Authoritative Name Server for one or more specified domains. According to a different implementation, the real Authoritative Domain Name Server may be configured to delegate the domain name lookup to the BOOM server 220.

In the example of FIG. 5, when the packet containing the DNS request arrives at the host server, the BOOM server 220 inspects and intercepts (5) the packet. According to a specific embodiment of the present invention, the BOOM server 220 does not automatically resolve the DNS record request, but rather forwards or shunts the DNS record request to selected BOOM client servers in the overlay network.

Thus, according to the embodiment of FIG. 5, after the BOOM server has intercepted the packet, the BOOM server analyzes the packet and identifies (6) the source device (e.g. name server 204) which sent the packet. According to a specific embodiment, the source device may be identified by looking at the tuple information (e.g. source IP address, destination IP address, source port number, a destination port number) included in the packet header. Once the source device has been identified, the BOOM server determines (7) or selects the appropriate BOOM client servers (BCSs) for receiving a forwarded copy of the DNS record request. A detailed description relating to the technique of how the BOOM server selects the appropriate clients is presented in a latter section of this application, entitled Scaling Issues.

Additionally, as shown at 8, the BOOM server encapsulates the intercepted DNS request packet in accordance with an encapsulation tunneling protocol so that the encapsulated packet may be tunneled to the selected BOOM client servers of the overlay network. According to a specific embodiment, the encapsulated packet will include all information relating to the originally received DNS A record request. Examples of conventional encapsulation tunneling protocols include GRE, IP/EP, LP2, etc.

After the BOOM server has encapsulated the packet corresponding to the intercepted DNS record request, the BOOM server replicates the encapsulated packet, and transmits (10*a*, 10*b*) the encapsulated packet (along with other desired information) to the selected BOOM client servers in the overlay networks using an encapsulation tunneling protocol. An example of an encapsulated packet is shown in FIG. 3 of the drawings.

Figure 3:
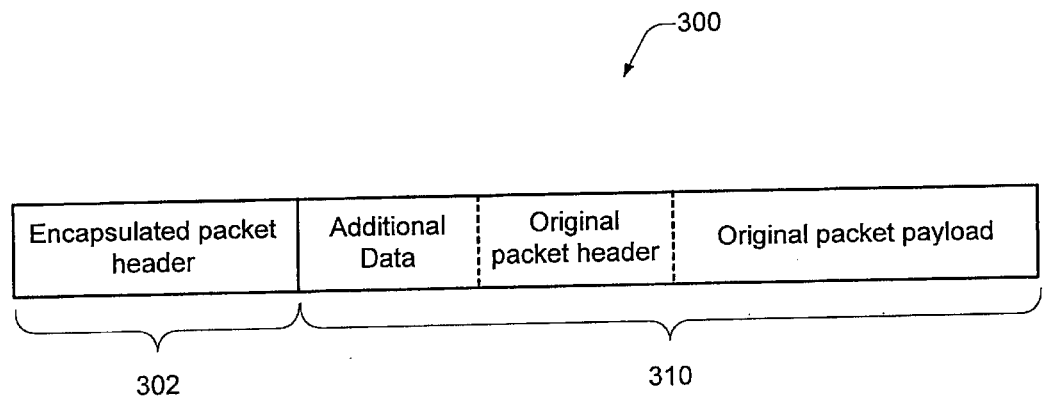
FIG. 3 shows a block diagram of a packet 300 which has been encapsulated in accordance with an encapsulation tunneling protocol.

FIG. 3 shows a block diagram of a packet 300 which has been encapsulated in accordance with an encapsulation tunneling protocol. As shown in FIG. 3, the encapsulated packet which is transmitted by the BOOM server 220 to the BOOM client servers 206 comprises a header portion 302, and a payload portion 310. The header portion 302 typically includes tuple data such as, for example, a source IP address, a destination IP address, a source port number, and a destination port number. The payload portion 310 includes all information from the original DNS request packet intercepted by the BOOM server 220. Additionally the payload portion 310 may also include additional data generated by the BOOM server such as, for example, trigger data relating to a specific time value at which the BOOM client server receiving the encapsulated packet is to transmit a response to the DNS query. As described previously, the encapsulated packet 300 of FIG. 3 may be implemented in accordance with a variety of encapsulation tunneling protocols, such as, for example, GRE, IP/IP, LP2, etc. Additional information relating to packet encapsulation and tunneling protocols is described in RFC document 2026, herein incorporated by reference in its entirety for all purposes.

For purposes of simplification and clarity, the example of FIG. 5 illustrates the BOOM server 220 tunneling the encapsulated packet to BOOM client servers 206*a* and 206*b*. However, it will be appreciated that a copy of the encapsulated packet may be tunneled or transmitted to any desired number of client servers in the overlay network. For example, as explained in greater detail below, the BOOM server 220 may forward the encapsulated packet to 10 specific BOOM client servers, a portion of which have been selected based upon the identity of the name server submitting the DNS query.

When the tunneled, encapsulated packet is received at each of the selected BOOM client servers (e.g., 206*a*, 206*b*), each server decapsulates and processes (12*a*, 12*b*) the DNS record request forwarded from the BOOM server. During this processing, each of the selected BOOM client servers generates a spoofed DNS response to the DNS query. More specifically, the each BOOM client server spoofs the host server 222, and resolves the DNS query with the IP address particular to the specific BOOM client server generating the response. For example, BOOM client server A (206*a*) generates a spoofed DNS response A, which includes an IP address associated with the BOOM client server A. Similarly, BOOM client server B (206*b*) generates a spoofed DNS response B, which includes an IP address associated with the BOOM client server B. According to the technique of the present invention, each spoofed response generated by a particular BOOM client server is conFIGUREd to appear as though the response were actually being generated by the authoritative name server for resolving the DNS query, which, in this example, is host server 222.

The technique of spoofing is commonly known to those having ordinary skill in the art, and is described, for example, in U.S. Pat. Nos. 6,016,388, 5,892,903, and 6,006,266, herein incorporated by reference in their entirety for all purposes. Additional server spoofing techniques similar to the technique implemented in the present invention are described in currently pending U.S. patent application Ser. No. 08/946,867 for METHOD AND APPARATUS FOR FACILITATING NETWORK DATA TRANSMISSIONS, filed Oct. 8, 1997; and U.S. Provisional Patent Application No. 60/168,862 for METHOD AND APPARATUS FOR REDIRECTING NETWORK TRAFFIC, filed Dec. 2, 1999, both of which are incorporated herein by reference in their entirety for all purposes.

Each spoofed DNS response is generated using the original DNS A record request included in the encapsulated packet. One reason for encapsulating and tunneling the DNS record request to the selected BOOM client servers is to enable the original packet to be routed appropriately, and to provide each of the selected BOOM client servers with the exact, original DNS A record request intercepted by the BOOM server. It will be appreciated that because each BOOM client server spoofs the host server, the spoofed response to the client system will pierce any intervening fire walls.

According to the embodiment of FIG. 5, each of the selected BOOM client servers transmits (14*a*, 14*b*) its respective spoofed DNS response to name server 204 at substantially the same time. In this way, each of the selected BOOM client servers participate in a race to be the first one to provide a response to name server 204. Presumably, the topologically closest BOOM client server will have the shortest propagation delay to the client. However, due to network congestion or other factors, the topologically closest BOOM client server to the client 702 may not necessarily win the response race. Fortunately, in accordance with the technique of the present invention, if the topologically closest BOOM client server (of the selected plurality of BOOM client servers) does not win the response race to the client system, it will typically be the case that the next topologically closest BOOM client server (of the selected plurality of BOOM client servers) will win the race. In this way, the technique of the present invention is able to resolve a client request by routing the client to a replica server, proxy server, or cache which is topologically closer to the requesting client than most or all of the other proxy servers in the overlay network.

In accordance with the technique of the present invention, a variety of different techniques may be used to ensure that all of the selected BOOM client servers transmit their respective responses to the name server 204 at substantially the same time. These techniques are described in greater detail in a latter section of this application, entitled Timing Issues.

Referring to the network topology example of FIG. 2, it is assumed that BOOM client server B 206b has the shortest propagation delay to name server 204. Thus, given that each of the BOOM client servers 206a, 206b, 206c transmits a response to the DNS query to name server 204 at substantially the same time, it may be concluded that the response from BOOM client server B will be received first at name server 204. Accordingly, as show in FIG. 5, the spoofed DNS response B (from BOOM client server B) is received first at name server 204. In accordance with standard DNS/UDP protocol, the name server will bind (16) the resolved IP address provided in the DNS response B (e.g., the IP address of BOOM client server B, 206b) to the domain name corresponding to host 222 (e.g., www.cnn.com). Additionally, in accordance with the standard DNS/UDP protocol, duplicate responses to the DNS query (e.g., spoofed DNS response A) which are subsequently received at name server 204 will be ignored (18).

At 20, name server 204 provides the resolved IP address (of BOOM client server B) to client 202 in response to the client's original DNS A record request. Thereafter, when the client machine 202 subsequently attempts to access information from host server 222 using the host domain name (e.g., www.cnn.com), the client's requests will automatically be routed (via name server 204) to BOOM client server B 206b, since that host domain name has been binded to the IP address corresponding to BOOM client server B.

According to at least one embodiment, the BOOM client server which generated the response first received at name server 204 (e.g. BOOM client server B) will identify itself as the successful BOOM client server which generated the spoofed response that was the first to be received at name server 204. In a specific implementation, the successful BOOM client server discovers that it is the successful client server when a client with a matching IP subnet subsequently attempts to access data from the successful BOOM client server within a predetermined time period (e.g. 0–60 seconds) after the BOOM client server has sent its spoofed DNS response to that client. Thus, for example, as shown in FIG. 5, after the client 202 has received a response to its DNS query, it may subsequently submit an HTTP request for accessing specific information from BOOM client server According to a specific embodiment, the host server may be included as one of the BOOM client servers for purposes of implementing the technique of the present invention. However, it will be appreciated that the host server does not generate a spoofed response. Alternatively, according to a different embodiment, it may be preferable to minimize the amount of traffic sent to the host server. Thus, according to a specific implementation, access to the host service may be restricted to the BOOM client servers of the overlay network. Alternatively, according to yet another embodiment of the present invention, the BOOM server forwards an intercepted request to the host server only after a specified time has elapsed. According to this later embodiment, the BOOM server first waits to see whether any one of the selected BOOM client servers is able to respond to the requesting client within a specified time window. If the selected BOOM client servers are not able to respond to the requesting client device within the specified time window, the BOOM server may then forward the intercepted request to the host server.

Timing Issues

As described previously with respect to the example of FIG. 5, it is important that all of the selected BOOM client servers which receive a copy of the encapsulated DNS record request (from BOOM server 220) transmit their respective spoofed response to the identified source device (e.g., name server 204) at substantially the same time. The example of FIG. 4 helps illustrate the importance of this concept.

Figure 4:
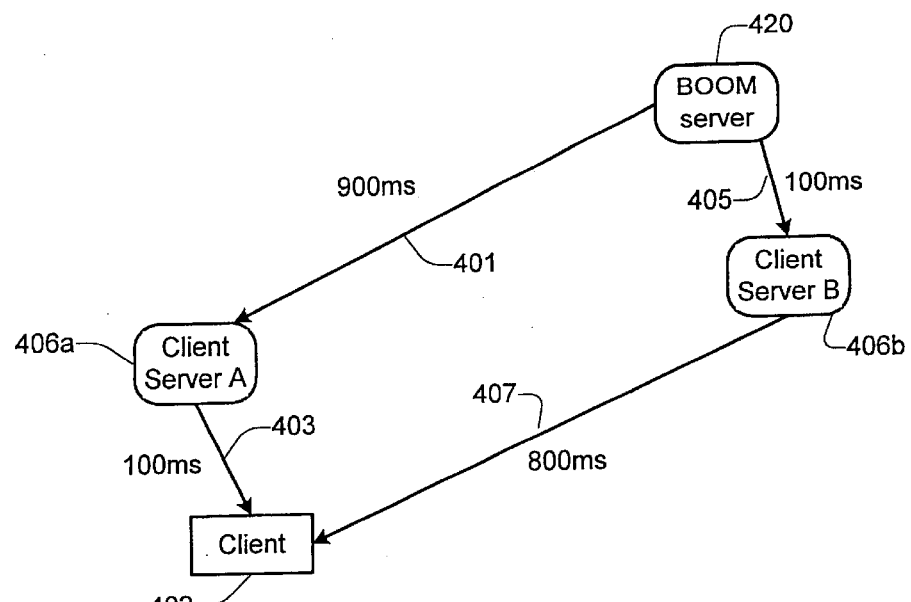
FIG. 4 shows an example of a specific topological configuration of various devices in a data network.

FIG. 4 shows an example of a specific topological configuration of various devices in a data network. Like the example of FIG. 2, the BOOM server 420 of FIG. 4 tunnels encapsulated client requests (from client 402) to client servers 406a and 406b. The client servers process the encapsulated client requests and generate spoofed responses which are then transmitted back to the client 402. The one way propagation delay time values between the various devices of FIG. 4 are identified by reference numbers 401, 403, 405, and 407. Thus, for example, the one way propagation delay value between BOOM server 420 and client server A 406a is 900 milliseconds; the one way propagation delay value between BOOM server 420 and client server B 406b is 100 milliseconds; the one way propagation delay between client server A 406a and client 402 is 100 milliseconds; and the one way propagation delay between client server B 406b and client 402 is 800 milliseconds.

According to at least one embodiment of the present invention, with each new flow, the BOOM server conducts a race between each of the selected client servers in order to determine which of the selected client servers is the first to respond to a particular client. Preferably, the race begins when each of the client servers (e.g., 406a, 406b) transmits its respective spoofed response to client 402 at substantially the same time. The client server associated with the spoofed response which is first received at client 402 is the winner of the race, and is designated the successful client server. In the example of FIG. 4, assuming that client server A and client server B each transmit their responses at substantially the same time, client server A will be designated the successful client server. However, it will be appreciated that if the race were to start from BOOM server 420 (e.g. from the time when the BOOM server forwards the client request to the selected client servers), then, according to the example of FIG. 4, client server B would win the race since the total propagation delay of paths 405 and 407 is less than the total propagation delay of paths 401 and 403. Accordingly, it is preferable that any propagation delays which exist between the BOOM Server 420 and the plurality of client servers (406*a*, 406*b*) be normalized or mitigated in order to assure that each of the client servers responds to the client 402 at substantially the same time.

According to the technique of the present invention, there are several techniques for causing all selected client servers to simultaneously respond to a client request forwarded from the BOOM server 420. According to a first embodiment, the BOOM server 420 may periodically send trace packets to each of the client servers in the overlay network in order to determine the respective one-way propagation delay value associated with communicating with each of the client servers. Thus, for example, referring to FIG. 4, the BOOM server may send trace packets to client server A and client server B in order to determine a roundtrip propagation delay value to each of these client servers. Using the roundtrip propagation delay values, the BOOM server is then able to compute the one-way propagation delay value associated with communicating with each respective client server. Thereafter, the BOOM server 420 may stagger the transmission time of each replica of the encapsulated request (e.g., DNS record request) to thereby cause the encapsulated requests to be received at each of the selected client servers at substantially the same time (e.g. within 10 milliseconds of each other). Thus, for example, at time T=0 ms the BOOM server may transmit the encapsulated client request to client server A, and at time T=800 ms the BOOM server may transmit a replica of the encapsulated client request to client server B, resulting in both client server A and client server B receiving a copy of the encapsulated client request at time T=900 milliseconds. At this point, the race begins for each client server to be the first one to successfully transmit a spoofed response to the encapsulated request which is first received at client 402.

Alternatively, rather than staggering the transmission times at BOOM server 420, the BOOM server may include a respective trigger time value in each encapsulated packet specifying a precise time in which a particular client server is to transmit its spoofed response. For example, at time T=0 ms, the BOOM server may forward a first encapsulated request to client server A, along with a trigger delay time value $T_d$=0 ms, which indicates that the client server A may immediately respond to the forwarded request. Additionally, on or about time T=0 ms, the BOOM server also forwards the encapsulated client request to client server B along with a trigger delay time value $T_d$=800 ms, which causes client server B to delay transmitting its spoofed response to the client request until 800 milliseconds have elapsed. In this way, each of the client servers 406*a* and 406*b* will transmit the respective spoofed responses to client machine 402 at or about time T=900 milliseconds.

It will be appreciated that the above-described timing techniques are particularly useful in systems where an asynchronous relationship exists between any of the devices (e.g., BOOM server, client servers) in the overlay network.

According to an alternate embodiment of the present invention, the BOOM server and each of the client servers in the overlay network are all synchronized to a common time reference. For example, according to a specific implementation, additional hardware and/or software is provided for synchronizing the BOOM server and each of the respective BOOM client servers which allows each server to be synchronized to a common time reference associated with a global positioning satellite (GPS) system. In this example each of the servers in the overlay network may be configured to support a network time protocol NTP), which is commonly known to one having ordinary skill in the art. A respective hardware device may additionally be installed at each server location which allows a server to receive Stratum 1 resolution time data using the NTP protocol. This is shown for example in FIG. 4A in the drawings.

Figure 4A:
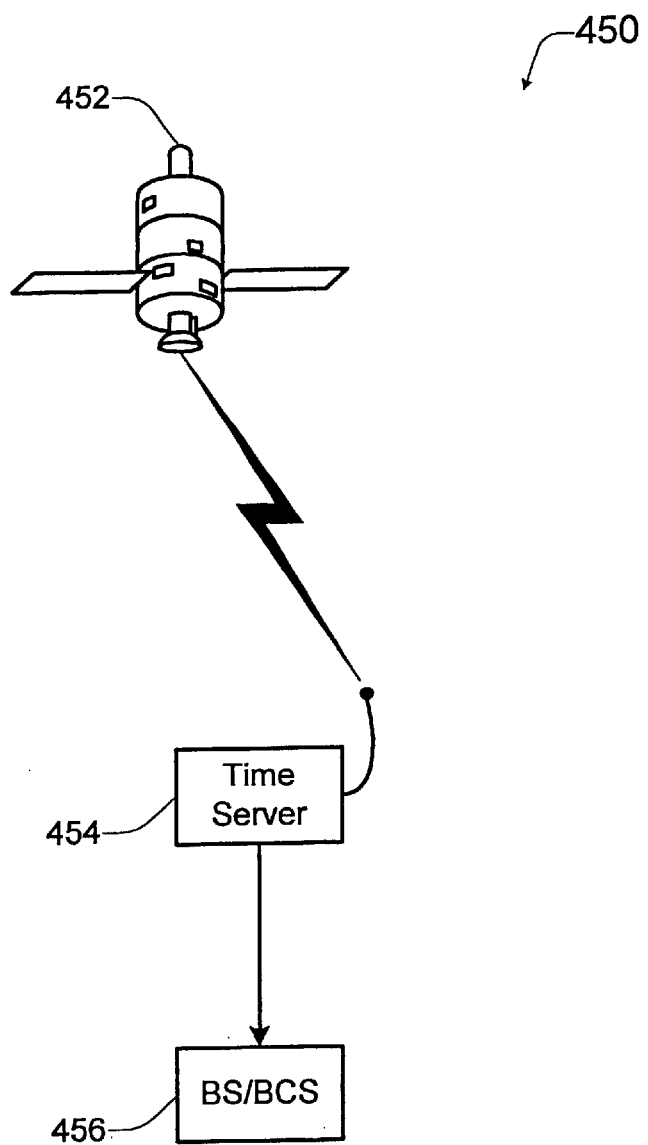
FIG. 4A shows a block diagram illustrating how synchronization may be achieved between each of the servers in the overlay network of the present invention.

FIG. 4A shows a block diagram illustrating how synchronization may be achieved between each of the servers in the overlay network of the present invention. A separate time server 454 may be connected to each server or device in the overlay network. The time server receives precise clock data (e.g., Stratum 1 resolution) from an orbiting satellite 452 which is part of a global satellite positioning system. The time server 454 converts a received time reference data into an NTP format which is then transmitted to the associated BOOM server or BOOM client server 456. According to a specific implementation time server device 454 may be implemented using a time server device manufactured by True Time, Inc., of Santa Rosa, Calif.

Assuming that synchronization has been achieved between each of the servers in the overlay network, the BOOM server 220 (FIG. 2) may then transmit, to selected BOOM client servers, encapsulated packets which include trigger information relating to a specific time at which each of the selected BOOM client servers is to transmit its response to the client 202 or name server 204. Thus, for example, referring to FIG. 4, during the time interval between time T=0 and T=10 milliseconds, the BOOM server may transmit encapsulated, tunneled packets to client server A and client server B. Each encapsulated packet will include information relating to the intercepted DNS request, and additional information specifying a trigger time value of $T_T$=1,000 ms. It is preferable that the specific trigger time value selected by the BOOM server be sufficiently far in advance to allow time for each of the selected client servers to receive the encapsulated packet and generate a spoofed response to the DNS request. Thereafter, at the specified trigger time, the race begins, and each of the selected client servers transmits its spoofed response to client 402.

Scaling Issues

As described previously, when the BOOM server intercepts a client request, it forwards the received request to a selected portion of the client servers in the overlay network using a multicast technique. Thus, it will be appreciated that for every request the BOOM server intercepts, it may forward the received request to N client servers in the overlay network. However, while the technique of the present invention works very well where N is relatively small (e.g., less than 100), scaling problems may arise in situations where N is relatively large (e.g. 10,000). For example, referring to FIG. 2, if the overlay network includes 10,000 BOOM client servers, and the BOOM server 220 forwards a copy of a DNS request to each BOOM client server in the overlay network, the name server 204 (which issued the DNS request) may be bombarded with as many as 10,000 responses. This, in turn, may result in network congestion and/or failure at the name server. While it may seem desirable to limit the size of N to a relatively small value, it will also be appreciated that, by increasing the size of N, there is an increased chance of selecting the optimal client server in the overlay network for servicing a particular client. Accordingly, one problem to solve relates to determining an optimal value for N. Additionally another problem to solve relates to determining which particular client servers should be included within the N client servers selected to respond to the intercepted request. However, the optimal solution to this problem may require searching an enormous solution space. Moreover, as the number of BOOM client servers and/or name servers increases, this solution space becomes exponentially larger. Even worse, since the Internet is a dynamic entity, the solutions may change in response to dynamic changes in the Internet topology such that a previously optimal solution may become a undesirable solution.

The above-described issues collectively exemplify the problems associated with combinatorial minimization. In combinatorial minimization, there is an objective function to be minimized, but the number of elements in the solution space is factorially large so that it cannot be explored exhaustively. The present inventive entity has provided a solution to the above-described problems by adapting a technique known as simulated annealing, which derives its name based upon its similarity to the thermodynamic property of metals as they cool and anneal.

Figure 6:
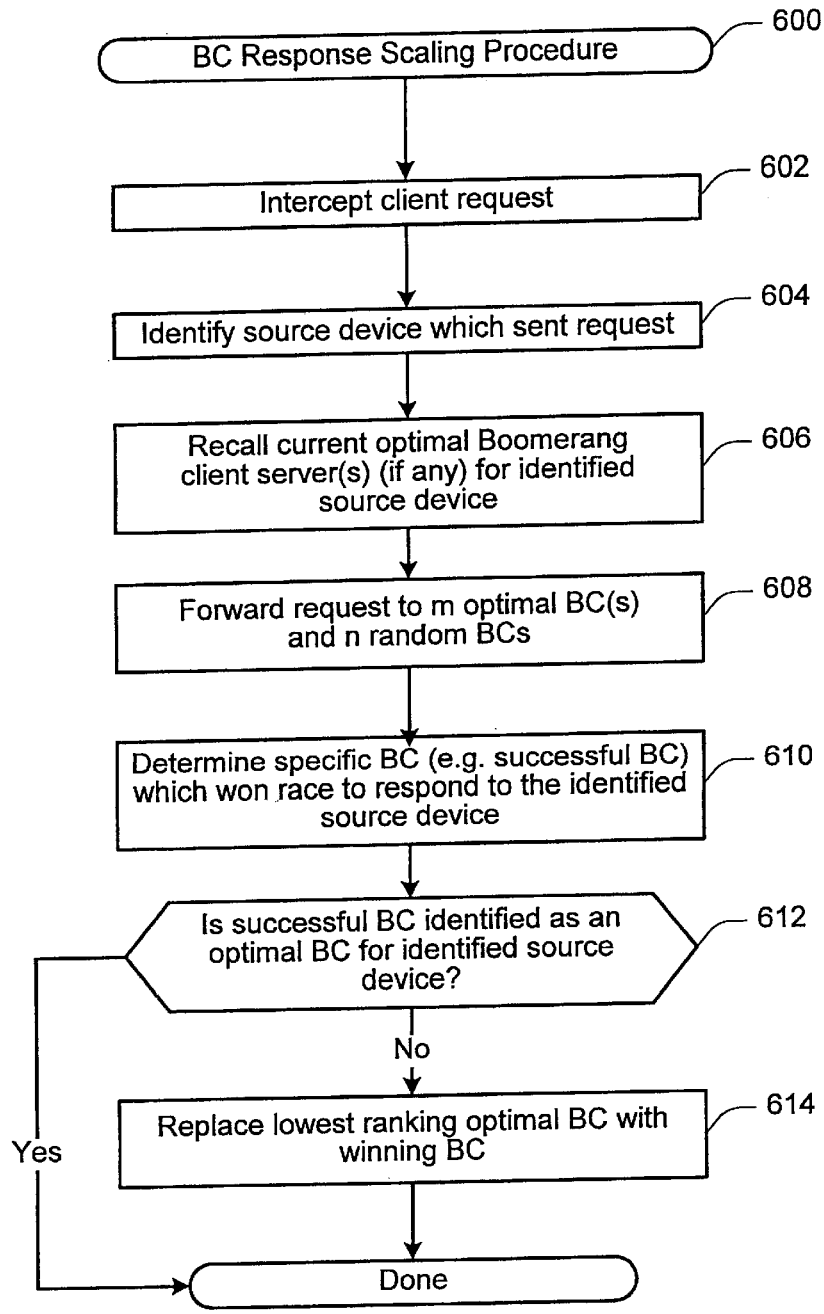
FIG. 6 shows a flow diagram of a BCS Response Scaling Procedure 600 in accordance with a specific embodiment of the present invention.

FIG. 6 shows a flow diagram of an BCS Response Scaling Procedure 600 in accordance with a specific embodiment of the present invention. The BCS Response Scaling Procedure 600 of FIG. 6 illustrates a specific embodiment of how the above-described scaling problems may be resolved in accordance with the technique of the present invention. At 602, a client request is intercepted by the BOOM server. The intercepted request will typically be implemented using a specific protocol such as, for example, TCP, DNS, UDP, etc., and will also include information identifying the source device which sent the intercepted request. For example, the intercepted request may be a DNS record request generated by name server 204 (FIG. 2). After intercepting the request, the BOOM server analyzes the request information to identify (604) the source device which issued the request. In this example, the BOOM server would identify the source device as name server 204. At 606, the BOOM server recalls all current optimal BOOM client server(s), if any, for the identified source device (e.g., name server 204). According to at least one embodiment, an optimal BOOM client server corresponds to a successful BOOM client server which has recently won at least one response race to the identified source device. According to a specific implementation, the BOOM server maintains a record of the three most recent BOOM client servers which have succeeded in winning the response race to the identified source device. It will be appreciated, however, that the number of optimal BOOM client servers (BCSs) associated with a specific source device may vary, depending upon design preferences.

Once the BOOM server has identified a pre-determined number m (e.g., m=3) of optimal BCSs associated with the identified source device, the BOOM server forwards (608) an encapsulated copy of the intercepted request to the m optimal BCSs, and additionally forwards the encapsulated request to n random BCSs. According to a specific implementation, the BOOM server will forward an encapsulated copy of the intercepted request to seven randomly selected BOOM client servers within the overlay network (not including the m optimal BOOM client servers). However, it will be appreciated that the number n may be adjusted as desired, depending upon design specifications.

After copies of the encapsulated request have been forwarded to the selected BOOM client servers, a particular one of the selected BOOM client servers will be identified as the successful BCS which won the race in responding the identified source device. This information gets reported back to the BOOM server as described previously in this application.

At 610, the BOOM server identifies the successful BCS which won the race in responding to the identified source device. In the DNS implementation of FIG. 5, the successful BOOM client server reports its success to the BOOM server.

After the BOOM server has identified the successful BCS, it determines (612) whether the successful BCS is already identified as an optimal BCS for the identified source device. If the successful BCS is already identified as an optimal BCS for the identified source device, no change is made to list of optimal BCSs associated with the identified source device. However, if the successful BCS is not identified as an optimal BCS for the identified source device, at 614, the BOOM server includes the successful BCS in the list of optimal BCSs associated with the identified source device. Additionally, according to a specific embodiment, when a new successful BCS is added to the list of optimal BCSs associated with a particular source device, a lowest ranking BCS from the optimal BCSs list is displaced. In one embodiment, the lowest ranking optimal BCS may be defined as the least recent optimal BCS to have won the response race to the identified source device.

Thus, according to at least one embodiment, the BCS Response Scaling Procedure 600 may be adapted to account for successful BCSs that die or suffer from network congestion by maintaining an "optimal BCS" list of the n most recent successful BCSs (e.g., n=3) for each identified source device in the data network. Additionally, the successful BCSs associated with a particular optimal BCS list may be sorted according to each BCS's most recent success, so that their status corresponds to a natural decay. Further, after the procedure 600 reaches a steady state for a particular source device (e.g., when there are no changes made to the optimal BCS list associated with a particular identified source device after a pre-determined number of cycles), the total number of BOOM client servers selected by the BOOM server to respond to a request associated with the identified source device may be reduced (e.g., from a total of 10 forwarded requests to a total of 5 forwarded requests).

In general, the BCS Response Scaling Procedure provides the BOOM server with the ability to "learn" the best set of BOOM client servers for a particular identified source device. Moreover, this is accomplished without the use of an Internet map (such as that used by Akamai), is accomplished without requiring the use of agents to communicate between the various nodes, and further is accomplished without requiring assumptions to be made about the distribution of the BOOM client servers or the identified source devices in the network. Additionally, it will be appreciated that the BCS response scaling procedure may be used to automatically and dynamically update and maintain optimal BCS lists in response to dynamic changes in the Internet topology.

It will be appreciated that the BCS Response Scaling Procedure 600 of FIG. 6 may require a substantial amount of memory resources for implementation. For example, each possible source device in the data network may have associated with it 10 IP addresses and a plurality of data structure pointers. Additionally, because the procedure is continuously learning and improving, it may be preferable to occasionally save current results to a stable storage.

Additionally, it will be appreciated that the technique of the present invention for distributing network traffic to a closest replica of a particular object may be implemented without the use of a gateway router between the client and the server. This feature is particularly important in modern ISP networks which include numerous, geographically disbursed data centers within a broadband mesh. Moreover, ISPs implementing such networks typically do not provide end user dial ports and, therefore, do not have traditional gateway routers.

Other Embodiments

Generally, the technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the BOOM server and BOOM client servers of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the BOOM server and BOOM client server devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the BOOM server and BOOM client server devices may be implemented on a general-purpose network host machine such as a personal computer or workstation. Further, the invention may be at least partially implemented on a card (e.g., an interface card) for a network device or a general-purpose computing device.

Figure 7:
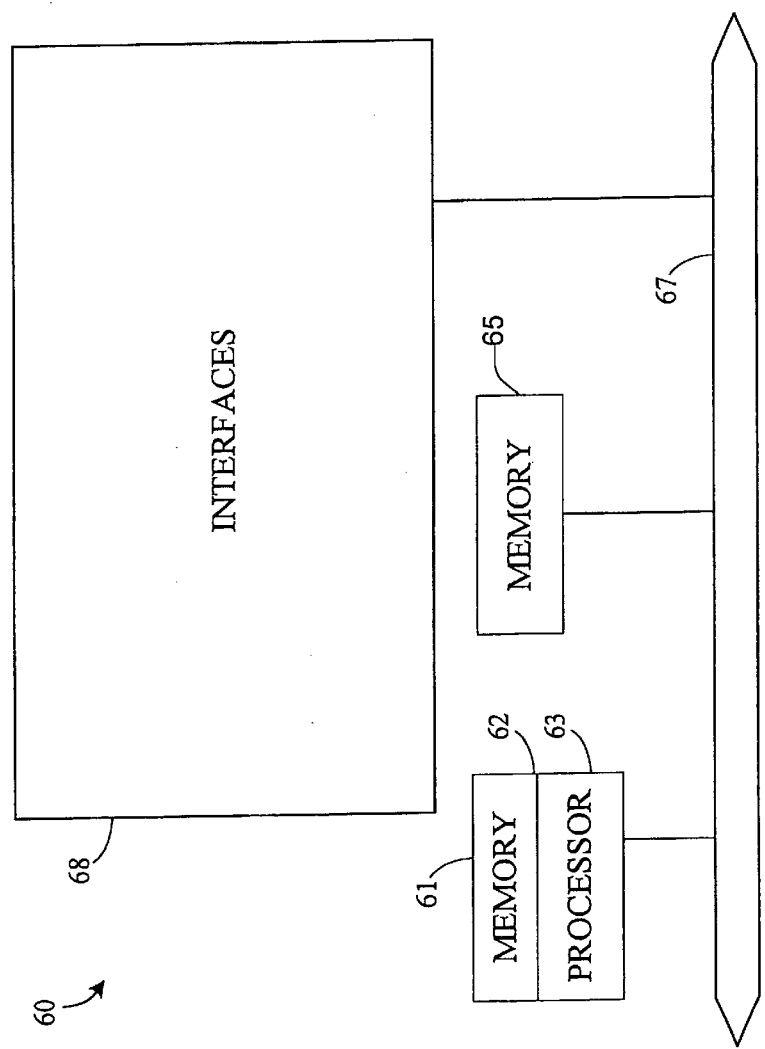
FIG. 7 shows a block diagram of a network device 60 suitable for implementing the BOOM server or BOOM client server devices of the present invention.

Referring now to FIG. 7, a network device 60 suitable for implementing the BOOM server or BOOM client server devices of the present invention includes a master central processing unit (CPU) 62, interfaces 68, and a bus 67 (e.g., a PCI bus). When acting under the control of appropriate software or firmware, the CPU 62 may be responsible for implementing specific functions associated with a particular device of the present invention. For example, when configured as a BOOM server, the CPU 62 may be responsible for intercepting and analyzing packets, encapsulating packets, forwarding packets to appropriate BOOM client servers, etc. When configured as a BOOM client server, the CPU 62 may be responsible for generating an appropriate spoofed response to an encapsulated packet received from the BOOM server. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the BOOM server of BOOM client server devices described herein. The program instructions may control the operation of an operating system and/or one or more applications, for example. The memory or memories may also be configured to store data structures which associate specific client systems with one or more specific (e.g. successful) BOOM client servers of the overlay network.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A method for facilitating communication between a client device and a specific client server of a subnetwork of client servers in a data network, the sub-network of client servers each including information corresponding to at least a portion of information stored on at least one host server, the method comprising:

receiving a first packet from a client device;

forwarding information relating to the first packet to a first portion of client servers in the sub-network; and causing each of the first potion of client servers to transmit, at substantially the same time, a respective spoofed response to the client device, wherein each spoofed response is generated using information from the first packet.

2. The method of claim 1 further comprising:

determining a successful client server associated with generating a particular spoofed response which was received first at the client device, the successful client server being one of the first portion of client servers; and binding an ID of the client device with an ID of the successful client server device.

3. The method of claim 2 further comprising causing said client device to communicate with the successful client server for accessing information associated with the at least one host server.

4. The method of claim 2 wherein the first request corresponds to a DNS record query for an address corresponding to the at least one host server, and wherein each spoofed response comprises a DNS record response specifying an IP address associated with a client server generating the spoofed response.

5. A method for facilitating communication between a client device and a specific client server of a subnetwork of client servers in a data network, the sub-network of client servers each including information corresponding to at least a portion of information stored on at least one host server, the method comprising:

receiving, at a first device, a first request from a client device;

identifying the client device using information from the first request;

determining, using the identified client device information, a first portion of the client servers for forwarding the first request;

forwarding information relating to the first request to the first portion of the client servers; and causing each of the first potion of client servers to respond to the client device at substantially the same time, wherein said causing is performed by the first device.

6. The method of claim 5 wherein the first request corresponds to a DNS record query, and wherein the client device corresponds to a name server.

7. The method of claim 5 wherein the client device corresponds to a client system.

8. The method of claim 5 wherein said forwarding further includes:

encapsulating the received first request in accordance with an encapsulation tunneling protocol; and transmitting the encapsulated packet to each of the first portion of client servers using the encapsulation tunneling protocol.

9. The method of claim 8 further comprising:

receiving, at a first client server, the tunneled, encapsulated packet;

generating, at said first client server using information from said received encapsulated packet, a first spoofed response to said first request; and transmitting said first spoofed response to the client device.

10. The method of claim 9 wherein the first request corresponds to a DNS record query, and wherein the first spoofed response comprises a DNS record response specifying an IP address associated with the first client server.

11. The method of claim 5 further comprising determining a respective propagation delay value associated with communicating with each client server of at least the first portion of client servers;

wherein said forwarding includes transmitting said first request information to each of the first portion of client servers at specific times such that the forwarded first request information is received at each of the first portion of client servers at substantially the same time.

12. The method of claim 5 further including:

determining a specific trigger time reference value for causing each of the first portion of client servers to transmit a respective spoofed response to the first request at a time corresponding to the trigger time reference value; and transmitting said trigger time reference value to each of the first portion of client servers along with the forwarded first request information to thereby cause each of the first portion of client servers to transmit a respective response to the client device at substantially the same time.

13. The method of claim 5 further comprising:

determining a respective propagation delay value associated with communicating with each client server of at least the first portion of client servers;

using the propagation delay information to generate a respective transmission delay time value for each of the first portion of client servers; and transmitting said transmission delay time values to each respective client server of the first portion of client servers along with the forwarded first request information to thereby cause each of the first portion of client servers to delay transmission of its respective spoofed response to the client device until a time period corresponding to the transmission delay time value has elapsed.

14. The method of claim 5 further comprising:

receiving, at the client device, a plurality of responses to the first request from at least some of the first portion of client servers;

processing an earliest received response of the plurality of received responses in accordance with a first technique, wherein information from the earliest received response is used by the client device to conduct subsequent communication transactions; and processing at least one duplicate responses to the first request in accordance with a second technique, wherein information from the at least one duplicate received response is not used by the client device to conduct subsequent communication transactions.

15. The method of claim 14:

wherein the first request corresponds to a DNS record query for a specific domain name;

wherein the client device includes a name server for receiving the plurality of responses; and wherein said processing includes:

determining, using information from said earliest received response, a specific IP address associated with the specific domain name, the specific IP address corresponding to a successful server which transmitted the earliest received response; and binding the specific IP address with the specific domain name.

16. The method of claim 5:

wherein said determining includes identifying at least one preferred client server associated with the identified client device; and wherein said first plurality of client servers includes said at least one preferred client server and at least one randomly selected client server from the sub-network.

17. The method of claim 16 further comprising:

identifying a successful client server of said first portion of client servers associated with generating a response to the first request which was first received at the client device; and if the identified client server is not classified as a preferred client server for communicating with the identified client device, classifying the identified client server as one of the at least one preferred client servers for communicating with the identified client device.

18. The method of claim 17 further comprising selecting a least preferred one of the at least one preferred client servers for preferred status degradation in response to the identified client server being classified as a preferred client server.

19. A method for facilitating communication between a client device and a specific client server of a subnetwork of client servers in a data network, the sub-network of client servers each including information corresponding to at least a portion of information stored on at least one host server, the method comprising:

receiving, at a first client server, a tunneled packet from an intercept server, said tunneled packet including encapsulated information relating to a first packet intercepted by the intercept server, said first packet including a source address and a destination address, said source address corresponding to a client device which generated the first packet, said first packet information relating to a request to resolve an address for a host name;

generating, at said first client server using information from said received tunneled packet, a first spoofed response to said request, wherein the first spoofed response includes a resolved address corresponding to an address of the first client server; and transmitting said first spoofed response to the client device.

20. The method of claim 19 wherein the first request corresponds to a DNS record query, and wherein the first spoofed response comprises a DNS record response specifying an IP address associated with the first client server.

21. The method of claim 19 wherein the tunneled packet includes transmission timing information relating to a specific trigger time at which the first client server is to transmit the first spoofed response to the client device, said method further comprising transmitting the first spoofed response to the client device at the specific trigger time.

22. The device of claim 19 wherein the tunneled packet includes transmission timing information relating to a specific transmission delay time value in which the first client server is to delay transmission of the first spoofed response to the client device, said method further comprising delaying transmission of the first spoofed response to the client device until a time period corresponding to the transmission delay time value has elapsed.

23. The method of claim 19 further comprising:

receiving, at a second client server, a tunneled packet from the intercept server, said tunneled packet including encapsulated information relating to a first packet intercepted by the intercept server, said first packet including a source address and a destination address, said source address corresponding to a client device which generated the first packet, said first packet information relating to a request to resolve an address for a host name;

generating, at said second client server using information from said received tunneled packet, a second spoofed response to said request, wherein the second spoofed response includes a resolved address corresponding to an address of the second client server; and transmitting said second spoofed response to the client device at substantially a same time that said first spoofed response is transmitted to the client device.

24. The method of claim 23 wherein the first request corresponds to a DNS record query, and wherein the second spoofed response comprises a DNS record response specifying an IP address associated with the second client server.

25. The method of claim 19 wherein the tunneled packet includes information relating to a specific trigger time for transmitting a response to the client device;

wherein said transmitting includes transmitting the first and second spoofed responses from each respective client server to the client device at a time value corresponding to the specific trigger time.

26. The method of claim 25 further comprising synchronizing said intercept server, said first client servers and said second client server.

27. A method for facilitating communication between a client device and a specific client server of a subnetwork of client servers in a data network, the sub-network of client servers each including information corresponding to at least a portion of information stored on at least one host server, the method comprising:

receiving, at a first plurality of client servers, a respective tunneled packet from an intercept server, said tunneled packet including encapsulated information relating to a first packet intercepted by the intercept server, said first packet including a source address and a destination address, said source address corresponding to a client device which generated the first packet, said first packet information relating to a request to resolve an address for a host name;

generating, at each of the first plurality of client servers a respective spoofed response to said first packet using information from said received tunneled packet, wherein the each spoofed response includes a respective resolved address corresponding to an address of a client server which generated the spoofed response; and transmitting each of the respective spoofed responses at substantially a same time to the client device.

28. The method of claim 27 further comprising:

receiving, at the client device, a plurality of responses to the first request from at least some of the first portion of servers;

processing an earliest received response of the plurality of received responses in accordance with a first technique, wherein information from the earliest received response is used by the client device to conduct subsequent communication transactions; and processing at least one duplicate responses to the first request in accordance with a second technique, wherein information from the at least one duplicate received response is not used by the client device to conduct subsequent communication transactions.

29. The method of claim 28:

wherein the first request corresponds to a DNS record query for a specific domain name;

wherein the client device includes a name server for receiving the plurality of responses; and wherein said processing includes:
  determining, using information from said earliest received response, a specific IP address associated with the specific domain name, the specific IP address corresponding to a successful server which transmitted the earliest received response; and
  binding the specific IP address with the specific domain name.

30. A computer program product for facilitating communication between a client device and a specific client server of a subnetwork of client servers in a data network, the sub-network of client servers each including information corresponding to at least a portion of information stored on at least one host server, the computer program product comprising:
  a computer usable medium having computer readable code embodied therein, the computer readable code comprising:
  computer code for receiving, at a first device, a request from a client device;
  computer code for identifying the client device using information from the first request;
  computer code for determining, using the identified client device information, a first portion of the client servers for forwarding the first request;
  computer code for forwarding information relating to the first request to the first portion of the client servers; and
  computer code for causing each of the first potion of client servers to respond to the client device at substantially the same time, wherein said causing is performed by the first device.

31. The computer program product of claim 30 further comprising computer code for determining a respective propagation delay value associated with communicating with each client server of at least the first portion of client servers;
  wherein said forwarding computer code includes computer code for transmitting said first request information to each of the first portion of client servers at specific times such that the forwarded first request information is received at each of the first portion of client servers at substantially the same time.

32. The computer program product of claim 30 further including:
  computer code for determining a trigger time value for causing each of the first portion of client servers to transmit a respective response to the first request at the specified trigger time; and
  computer code for transmitting said trigger time value to each of the first portion of client servers along with the forwarded first request information to thereby cause each of the first portion of client servers to transmit a respective response to the client device at substantially the same time.

33. A computer program product for facilitating communication between a client device and a specific client server of a subnetwork of client servers in a data network, the sub-network of client servers each including information corresponding to at least a portion of information stored on at least one host server, the computer program product comprising:
  a computer usable medium having computer readable code embodied therein, the computer readable code comprising:
  computer code for receiving, at a first client server, a tunneled packet from an intercept server, said tunneled packet including information relating to a first request from the client device to resolve an address for a host name;
  computer code for generating, at said first client server using information from said received tunneled packet, a first spoofed response to said first request; and
  computer code for transmitting said first spoofed response to the client device.

34. The computer program product of claim 33 further comprising:
  computer code for receiving, at a second client server, a tunneled packet from said intercept server, said tunneled packet including information relating to a request from the client device to resolve an address of the host name;
  computer code for generating, at said second client server using information from said received tunneled packet, a second spoofed response to said first request;
  computer code for transmitting said second spoofed response to the client device at substantially the same time that said first spoofed response is transmitted to the client device.

35. A system for facilitating communication between a client device and a specific client server of a subnetwork of client servers in a data network, the sub-network of client servers each including information corresponding to at least a portion of information stored on at least one host server, the system comprising:
  an intercept server configured or designed to communicate with a plurality of client servers and a client device;
  said intercept server being configured or designed to intercept a request from the client device;
  said intercept server being further configured or designed to identify the client device using information from the first request;
  said intercept server being further configured or designed to determine, using the identified client device information, a first portion of the client servers for forwarding the first request;
  said intercept server being further configured or designed to forward information relating to the first request to the first portion of the client servers;
  said intercept server being further configured or designed to cause each of the first potion of client servers to respond to the client device at substantially the same time.

36. The system of claim 35 wherein said intercept server is further configured or designed to encapsulate the received first request in accordance with an encapsulation tunneling protocol, and is further configured or designed to transmit the encapsulated packet to each of the first portion of client servers using the encapsulation tunneling protocol.

37. The system of claim 35 wherein said intercept server is further configured or designed to determine a respective propagation delay value associated with communicating with each client server of at least the first portion of client servers, and is further configured or designed to transmit said first request information to each of the first portion of client servers at specific times such that the forwarded first request information is received at each of the first portion of client servers at substantially the same time.

38. The system of claim 35 wherein said intercept server is further configured or designed to determine a trigger time value for cause each of the first portion of client servers to transmit a respective response to the first request at the specified trigger time, and is further configured or designed to transmit said trigger time value to each of the first portion of client servers along with the forwarded first request information to thereby cause each of the first portion of client servers to transmit a respective response to the client device at substantially the same time.

39. The system of claim 35 wherein said intercept server includes memory comprising information relating to at least one preferred client server associated with the client device, wherein the intercept server is further configured or designed to identify, using the identified client device information, the at least one preferred client server for communicating with said client device;

wherein said first plurality of client servers includes said at least one preferred client server and at least one randomly selected client server associated with the sub-network.

40. The system of claim 39 wherein said intercept server is further configured or designed to identify a successful client server of said first portion of client servers associated with generate a response to the first request which was first received at the client device, and is further configured or designed to classify the identified client server as one of the at least one preferred client servers for communicate with the identified client device if the identified client server is not classified as a preferred client server for communicate with the identified client device, classify the identified client server as one of the at least one preferred client servers for communicate with the identified client device.

41. The system of claim 40 wherein said intercept server is further configured or designed to select a least preferred one of the at least one preferred client servers for preferred status degradation in response to the identified client server bee classified as a preferred client server.

42. A network device comprising:
   at least one CPU;
   memory, said memory including a first portion of memory configured or designed to store information associated with at least one host server in a data network; and
   at least one interface for receiving a tunneled packet from an intercept server, said tunneled packet including encapsulated information relating to a first packet intercepted by the intercept server, said first packet including a source address and a destination address, said source address corresponding to a client device associated with generating the first packet, said first packet information relating to a request to resolve an address for a host name;
   said network device being configured or designed to generate, using information from said received tunneled packet, a first spoofed response to said request, wherein the first spoofed response includes a resolved address corresponding to an address of the network device;
   said network device being further configured or designed to transmit said first spoofed response to the client device.

43. The device of claim 42 wherein the first request corresponds to a DNS record query, and wherein the first spoofed response comprises a DNS record response specifying an IP address associated with the network device.

44. The device of claim 42 wherein the tunneled packet includes transmission timing information relating to a specific time at which the network device is to transmit the first spoofed response to the client device, and wherein the network device is further configured or designed to transmit the first spoofed response to the client device at the specified time.

45. A system for routing traffic in a data network, the data network including at least one host server and an intercept server configured or designed to intercept packets directed to the at least one host server, the system comprising:
   a plurality of client servers configured or designed to store information corresponding to information stored on the at least one host server;
   wherein the plurality of client servers includes:
   a first client server configured or designed to receive a tunneled packet from the intercept server, said tunneled packet including information relating to a request from a client device to resolve an address for a host name;
   the first client server being further configured or designed to generate, using information from the received tunneled packet, a first spoofed response to said first request; and
   wherein the first client server is further configured or designed to transmit said first spoofed response to the client device.

46. The system of claim 45 wherein the first request corresponds to a DNS record query, and wherein the first spoofed response comprises a DNS record response specifying an IP address associated with the first client server.

47. The system of claim 45 wherein said client device is configured or designed to receive a plurality of responses to the first request from at least some of the first portion of client servers;
   said client device being further configured or designed to process an earliest received response of the plurality of received responses in accordance with a first technique, wherein information from the earliest received response is used by the client device to conduct subsequent communication transactions; and
   wherein said client device is further configured or designed to process at least one duplicate responses to the first request in accordance with a second technique, wherein information from the at least one duplicate received response is not used by the client device to conduct subsequent communication transactions.

48. The system of claim 47:
   wherein the first request corresponds to a DNS record query for a specific domain name;
   wherein the client device includes a name server for receive the plurality of responses; and
   wherein the name server is configured or designed to determine, using information from said earliest received response, a specific IP address associated with the specific domain name, the specific IP address corresponding to a successful server which transmitted the earliest received response; and
   wherein the name server is further configured or designed to bind the specific IP address with the specific domain name.

49. A system for routing a client device to access a specific server in a data network, the system comprising:
   a sub-network of client servers which include information corresponding to information stored on at least one host server; and
   at least one intercept server configured or designed to intercept at least one packet routed to the at least one host server, the intercepted packet including information for identifying a client device associated with the packet, the intercept server being further configured or designed to forward information relating to the intercepted packet to a selected portion of the client servers in the sub-network;

wherein each of the selected portion of client servers is configured or designed to transmit, at substantially the same time, a respective spoofed response to the client device, wherein each spoofed response is generated using information from the intercepted packet.

50. The system of claim 49:

wherein the intercept server is further configured or designed to determine a successful client server associated with generating a particular spoofed response which was received first at the client device, the successful client server being one of the selected portion of client servers, and is further configured or designed to bind an ID of the client device with an ID of the successful client server device.

51. The system of claim 50 further wherein the system is configured or designed to cause the client device to communicate with the successful client server for accessing information associated with the at least one host server.

52. The system of claim 50 wherein the intercepted packet corresponds to a DNS record query for an address corresponding to the at least one host server, and wherein each spoofed response comprises a DNS record response specifying an IP address associated with a client server generating the spoofed response.

53. A device for facilitating communication between a client device and a specific client server of a subnetwork of client servers in a data network, the sub-network of client servers each including information corresponding to at least a portion of information stored on at least one host server, the device comprising:

means for receiving a first packet from a client device;

means for forwarding information relating to the first packet to a first portion of client servers in the sub-network; and means for causing each of the first potion of client servers to transmit, at substantially the same time, a respective spoofed response to the client device.

54. The device of claim 53 further comprising:

means for determining a successful client server associated with generating a particular spoofed response which was received first at the client device, the successful client server being one of the first portion of client servers; and means for binding an ID of the client device with an ID of the successful client server device.

55. The device of claim 54 further comprising means for causing said client device to communicate with the successful client server for accessing information associated with the at least one host server.

56. The device of claim 53 wherein the first request corresponds to a DNS record query for an address corresponding to the at least one host server, and wherein each spoofed response comprises a DNS record response specifying an IP address associated with a client server generating the spoofed response.

57. A system for facilitating communication between a client device and a specific client server of a subnetwork of client servers in a data network, the sub-network of client servers each including information corresponding to at least a portion of information stored on at least one host server, the system comprising:

means for receiving, at a first client server, a tunneled packet from an intercept server, said tunneled packet including encapsulated information relating to a first packet intercepted by the intercept server, said first packet including a source address and a destination address, said source address corresponding to a client device which generated the first packet, said first packet information relating to a request to resolve an address for a host name;

means for generating, at said first client server using information from said received tunneled packet, a first spoofed response to said request, wherein the first spoofed response includes a resolved address corresponding to an address of the first client server; and means for transmitting said first spoofed response to the client device.

* * * * *